No. 805,520. PATENTED NOV. 28, 1905.
C. BERGHOEFER.
TRAVELING CONVEYER SYSTEM.
APPLICATION FILED MAY 25, 1903.
2 SHEETS—SHEET 1.
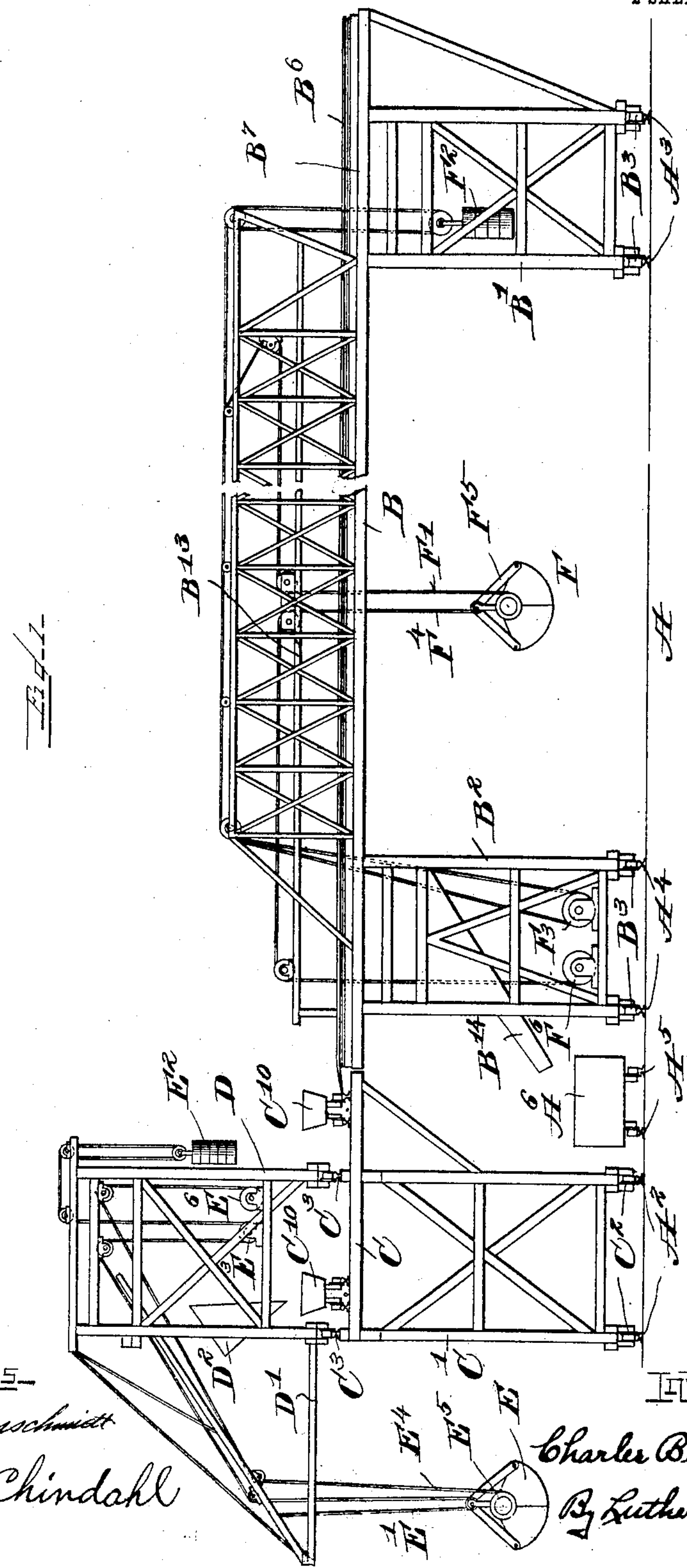
Witnesses
G. A. Pauberschmidt
George L. Chindahl
Inventor
Charles Berghoefer
By Luther L. Miller
Atty.

C. BERGHOEFER.
TRAVELING CONVEYER SYSTEM.
APPLICATION FILED MAY 25, 1903.
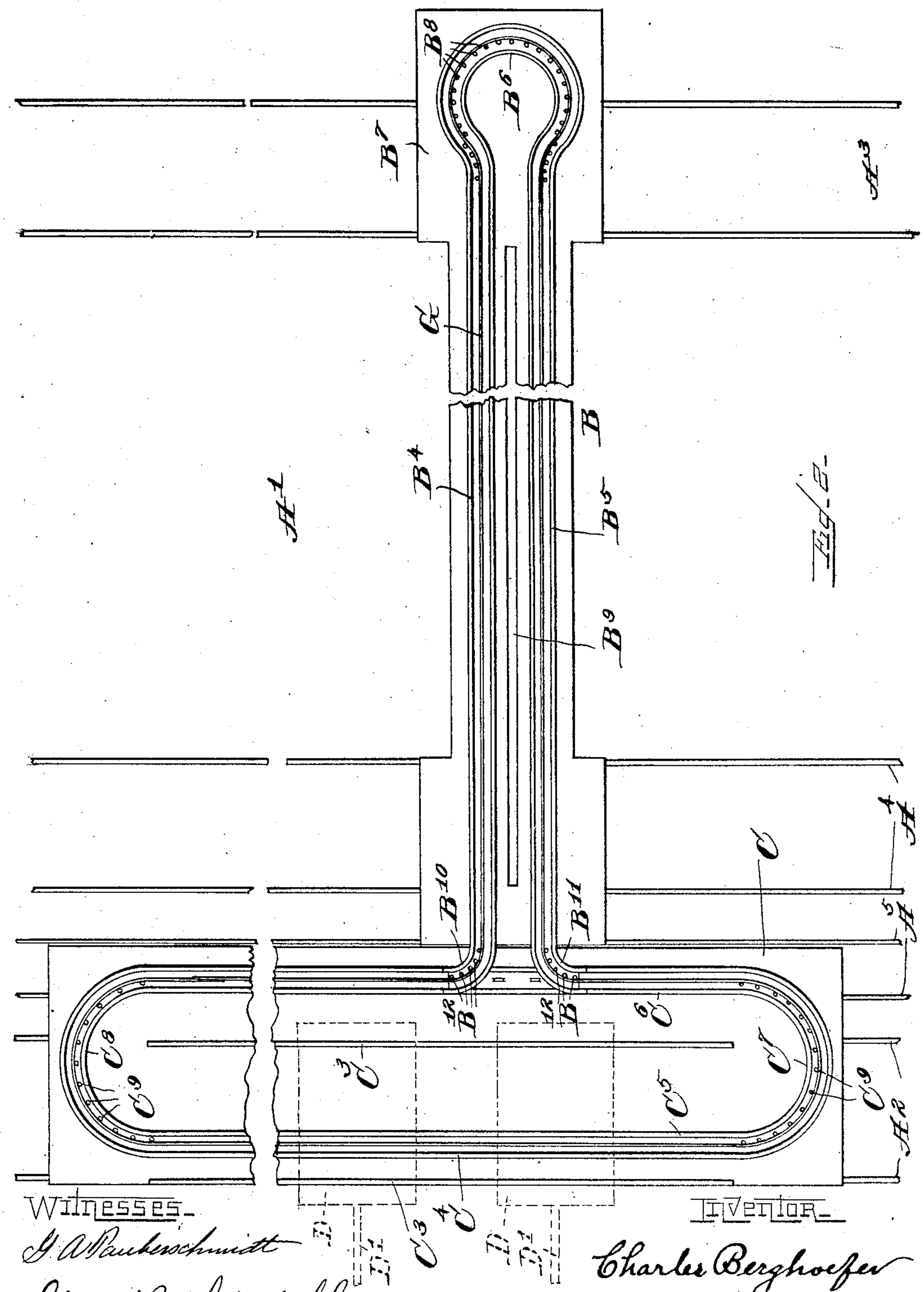
Witnesses: G. A. Pankenschmidt, George L. Chindahl
Inventor: Charles Berghoefer, By Luther L. Miller, Atty.

UNITED STATES PATENT OFFICE.

CHARLES BERGHOEFER, OF CHICAGO, ILLINOIS.

TRAVELING CONVEYER SYSTEM.

No. 805,520. Specification of Letters Patent. Patented Nov. 28, 1905.

Application filed May 25, 1903. Serial No. 158,668.

*To all whom it may concern:*

Be it known that I, CHARLES BERGHOEFER, a citizen of the United States, residing at Chicago, in the county of Cook and State of Illinois, have invented certain new and useful Improvements in Traveling Conveyer Systems, of which the following is a specification.

This invention relates to conveyers, and refers particularly to a traveling system adapted to be moved to any point in the length of a long dock or yard to load or unload any portion of said dock or yard. Heretofore long docks have been equipped with expensive structures extending the full length of the dock frontage, one at the front and the other at the rear of the dock, which structures are connected by a movable bridge spanning the intervening storage-space.

One of the objects of this invention is to do away with the necessity for such permanent structures, substituting for them a structure having a length much less than the entire frontage, which structure is movably mounted upon wheels running upon suitable traction-rails extending along the dock frontage. By this arrangement the traveling structure may be moved to command any portion of the storage-space on the dock.

The invention further refers to the various improvements in structure and in detail, hereinafter more fully pointed out.

In the accompanying drawings, Figure 1 is a side elevation of a structure embodying the features of my invention. Fig. 2 is a top plan view of the same.

Referring to the drawings, A designates a dock commanded by the traveling conveyer system of this invention, and A′ the storage-space upon said dock. Along the forward edge of the dock is a track $A^2$ and along the rear line of the dock a similar track $A^3$. Near the track $A^2$ and parallel therewith a third track $A^4$ is provided, and between the tracks $A^2$ and $A^4$ a car-track $A^5$ is located, upon which latter track carrying-cars $A^6$ may be run.

A bridge B spans the storage-space A′ upon the dock, being supported at its ends upon the structures B′ and $B^2$, which structures by suitable traction-wheels $B^3$ are carried upon the tracks $A^3$ and $A^4$, respectively. The bridge B is provided with the traction-tracks $B^4$ and $B^5$, connected at their rear ends by means of a loop-track $B^6$, which loop-track is supported upon a platform $B^7$, comprising a portion of the bridge B. The loop $B^6$ is provided with a series of rollers $B^8$ for guiding an endless traction-cable, to be hereinafter described. Between the tracks $A^3$ and $A^4$ the bridge B has an elongated opening $B^9$ to permit the passage of operating-cables for a clam-shell conveyer system, to be hereinafter more fully described. The forward ends of the tracks $B^4$ and $B^5$ are provided with outwardly-turning curves $B^{10}$ and $B^{11}$, respectively, carried by the bridge, each of which curves has a series of guide-rollers $B^{12}$ for directing the traction-cable. Above its track-surface the bridge B is equipped with a conveyer-track $B^{13}$ for the clam-shell system thereon. The bridge-supporting structure is provided with a loading-chute $B^{14}$ for receiving the material from the clam-shell buckets and delivering it to the carrying-cars $A^6$ upon the track $A^5$.

An elevated unloading-platform C extends along the forward edge of the dock A and is supported by a suitable structure C′, the lower portion of which structure carries traction-wheels $C^2$, running upon the track $A^2$, whereby the unloading-platform may be moved to any position along the dock. The unloading-platform has a track $C^3$ for supporting one or more unloading-towers, to be hereinafter described, and is provided with an endless track $C^4$ in the form of a narrow elongated loop, the sides of which track for convenience will be designated as $C^5$ and $C^6$ and the curved ends thereof $C^7$ and $C^8$. The curves $C^7$ and $C^8$ are each provided with guide-rollers $C^9$ for the traction-cable. Carrying-cars $C^{10}$ are adapted to run upon the track of the loop $C^4$, across the bridge B, upon the tracks $B^4$ and $B^5$, and around the loop $B^6$ at the rear end of said bridge.

The unloading-towers D, as hereinbefore stated, are adapted to be moved upon the track $C^3$, and thus may be brought into coincidence with the hatchways of a vessel to remove the cargo. Each of the unloading-towers D has an arm D′ projecting out from the tower, and within the tower is provided a chute $D^2$ for receiving material from the clam-shell buckets of the unloading system and discharging it into the carrying-cars $C^{10}$ upon the track $C^4$ on the platform C.

The loading clam-shell system is the same for each of the unloading-towers and will next be described. A clam-shell bucket E of ordinary construction is connected, by means of a hoisting-cable E', with a counterweight $E^2$, passing intermediate said bucket and said weight several times around a hoisting-drum $E^3$. A tripping-cable $E^4$ passes over a sheave $E^5$ on the bucket E and at its other end is wound upon the bucket-opening drum $E^6$. Power for rotating the hoisting-drum $E^3$ and the bucket-opening drum $E^6$ is supplied by means of a prime mover (not shown) located at any convenient point.

The loading clam-shell system for removing material from the storage-space A' comprises a clam-shell bucket F, suspended from the bridge B by a hoisting-cable F', which cable at its opposite end is provided with a counterweight $F^2$ and intermediate its ends extends over the hoisting-drum $F^3$. A tripping-cable $F^4$ lies in the groove of a sheave $F^5$ on the clam-shell bucket F, its other end being wound upon an opening-drum $F^6$. Power to rotate the hoisting-drum $F^3$ and the opening-drum $F^6$ is supplied by any suitable prime mover. (Not shown.)

An endless traction-cable G is carried by the bridge B and the elevated frontage-platform C, said cable extending from a driving means (not shown) in the structure C' at a point beneath the elevated platform C, along the side $C^6$ of the endless track $C^4$, across the bridge between the rails of the track $B^4$, around the loop $B^6$, (being guided by the rollers $B^8$ of said loop,) returning across the bridge between the rails of the track $B^5$, entering the endless track $C^4$ on the side $C^6$ thereof, extending around the curved end $C^7$ of said loop-track, being guided by the rollers $C^9$, thence along the side $C^5$ of the loop, around the other curved end $C^8$ of the loop-track, and downward through the platform C to said driving means. The carrying-cars $C^{10}$ are adapted to grip the traction-cable G and to make the circuit described by the tracks of the loop $C^4$ and the bridge B. The cars $A^6$ of the loading system are adapted to run upon the track $A^5$, which may be extended from the dock to any convenient point—as, for instance, to the deck of a vessel moored at the dock.

In operation the unloading-platform C is moved in any convenient way into proximity with the vessel to be unloaded, which vessel has previously been placed beside that portion of the dock to which its cargo is to be transferred. The bridge B is then moved with relation to said unloading-platform C into a position to span that portion of the dock upon which the cargo of the vessel is to be deposited. The unloading-towers D are then moved relatively to the unloading-platform C, so that they will be in a position coincident with the respective hatchways of the vessel. The unloading clam-shell bucket of each of the unloading-towers is then operated in the usual manner to remove the cargo of the vessel through its hatchways, raising bucketfuls of said cargo and discharging them through the chute $D^2$ into the carrying-cars $C^{10}$. An operator at each unloading-tower causes the carrying-cars to be connected with the endless traction-cable G by any suitable means, as by a gripping device. (Not shown.) Motion having previously been transmitted to the endless cable G, the carrying-cars $C^{10}$ are caused to travel along the side $C^5$ of the loop $C^4$, around the curved end $C^8$ of said loop, over a portion of the side $C^6$ of said loop, around the curve $B^{10}$, carried by the bridge B, over said curve onto the bridge-track $B^4$; and outward upon said bridge to a position where its contents are dumped into the storage-space A'. The travel of the car $C^{10}$ is continued along the bridge-track $B^4$, said car passing thence around the loop $B^6$, returning across the bridge B on the track $B^5$, over the curve $B^{11}$, carried by said bridge, and onto the track $C^6$ at the side of the loop $C^4$, thence passing around the curved end $C^7$ of said loop to the side $C^5$ and to the starting-point. The car is stopped under any one of the unloading-towers D and is again loaded and connected with the endless cable G to be carried around the cable-loop.

When the storage-space A' on the dock is to be unloaded, the clam-shell bucket F raises material from said storage-space and discharges it into the chute $B^{14}$, from which chute said material runs into the carrying-cars $A^6$, by means of which cars it may be transported to any desirable point.

It is apparent that the apparatus herein shown is susceptible of many modifications without departing from the spirit and scope of my invention, wherefore I desire to have it understood that I do not limit myself to the precise form illustrated and described.

I claim as my invention—

1. In a traveling conveyer system, in combination, a longitudinally-movable platform of elongated rectangular form; a bridge movable longitudinally of said platform, said bridge spanning the storage-space; and a traction-track extending over said platform and said bridge.

2. In a traveling conveyer system, in combination, a longitudinally-movable platform; a bridge movable longitudinally of said platform; and a continuous loop-track extending over said platform and said bridge.

3. In a traveling conveyer system, in combination, a longitudinally-movable platform; a bridge movable longitudinally of said platform; a continuous loop-track extending over said platform and said bridge; and an endless traction-cable for said loop-track.

4. In a traveling conveyer system, in combination, a platform; a bridge movable longitudinally of said platform; a traction-track in continuous loop form upon said platform;

and a traction-track upon said bridge adapted to connect with the loop-track upon said platform.

5. In a traveling conveyer system, in combination, a platform; a bridge movable longitudinally of said platform; a traction-track in continuous loop form upon said platform; a traction-track upon said bridge adapted to connect with the loop-track upon said platform; and an endless traction-cable for said traction-tracks.

6. In a traveling conveyer system, in combination, a platform; a bridge movable longitudinally of said platform; a traction-track in continuous loop form upon said platform; a double traction-track on said bridge, the ends of the track upon the bridge being connected with one side of the loop-track on the platform by means of curves; and an endless traction-cable for said traction-tracks.

7. In a traveling conveyer system, in combination, a longitudinally-movable platform; a bridge movable beside and longitudinally of said platform; a traction-track in continuous loop form upon said platform; and a traction-track upon said bridge adapted to connect with the loop-track upon said platform.

8. In a traveling conveyer system, in combination, a longitudinally-movable platform; a bridge movable beside and longitudinally of said platform; a traction-track in continuous loop form upon said platform; a traction-track upon said bridge adapted to connect with the loop-track upon said platform; and an endless traction-cable for said traction-tracks.

9. In a traveling conveyer system, in combination, a longitudinally-movable platform; a bridge movable beside and longitudinally of said platform; a traction-track in continuous loop form upon said platform; a double traction-track on said bridge, the ends of the track upon the bridge being connected with one side of the loop-track on the platform by means of curves; and an endless traction-cable for said traction-tracks.

10. In a traveling conveyer system, in combination, a longitudinally-movable platform; a tower supported by said platform and movable longitudinally thereof; and a bridge movable beside and longitudinally of said platform.

11. In a traveling conveyer system, in combination, a longitudinally-movable platform; a tower supported upon said platform and movable longitudinally thereof; a bridge movable beside and longitudinally of said platform; and a traction-track extending over said platform and said bridge.

12. In a traveling conveyer system, in combination, a longitudinally-movable platform; a tower supported upon said platform and movable longitudinally thereof; a bridge movable beside and longitudinally of said platform; a traction-track extending over said platform and said bridge into proximity with said tower; and a traction-cable for said traction-track.

13. In a traveling conveyer system, in combination, a longitudinally-movable platform; a tower supported upon said platform and movable longitudinally thereof; a bridge movable beside and longitudinally of said platform; a continuous loop-track extending over said platform and said bridge into proximity with said tower; and an endless traction-cable for said traction-track.

14. In a traveling conveyer system, in combination, a longitudinally-movable platform; an unloading-tower supported upon said platform and movable longitudinally thereof; a bridge movable beside and longitudinally of said platform; a traction-track in continuous loop form upon said platform; a traction-track upon said bridge adapted to connect with the loop-track upon said platform; and an endless traction-cable for said traction-tracks.

15. In a traveling conveyer system, in combination, a longitudinally-movable platform; an unloading-tower supported upon said platform and movable longitudinally thereof; a bridge movable with relation to said platform; a traction-track in continuous loop form on said platform; a double traction-track on said bridge, the ends of the track upon the bridge being connected with one side of the loop-track on the platform by means of curves; and an endless traction-cable for said traction-tracks.

CHARLES BERGHOEFER.

Witnesses:
L. L. MILLER,
GEORGE L. CHINDAHL.